United States Patent
Larcher et al.

(10) Patent No.: US 7,767,617 B2
(45) Date of Patent: Aug. 3, 2010

(54) REDUCED MAXIMUM REDUCIBILITY TEMPERATURE ZIRCONIUM OXIDE AND CERIUM OXIDE BASED COMPOSITION, METHOD FOR THE PRODUCTION AND USE THEREOF AS A CATALYST

(75) Inventors: Olivier Larcher, Perigny (FR); Emmanuel Rohart, Sainte Soulle (FR)

(73) Assignee: Rhodia Operations, Aubervilliers (FR)

( * ) Notice: Subject to any disclaimer, the term of this patent is extended or adjusted under 35 U.S.C. 154(b) by 1242 days.

(21) Appl. No.: 10/549,957

(22) PCT Filed: Mar. 17, 2004

(86) PCT No.: PCT/FR2004/000647
§ 371 (c)(1),
(2), (4) Date: Sep. 16, 2005

(87) PCT Pub. No.: WO2004/085806
PCT Pub. Date: Oct. 7, 2004

(65) Prior Publication Data
US 2006/0178261 A1 Aug. 10, 2006

(30) Foreign Application Priority Data
Mar. 18, 2003 (FR) .................. 03 03289

(51) Int. Cl.
*B01J 23/00* (2006.01)
*B01J 23/10* (2006.01)
(52) U.S. Cl. .............. 502/304; 502/302; 502/303; 502/349
(58) Field of Classification Search ............ 502/302, 502/303, 304, 349
See application file for complete search history.

(56) References Cited

U.S. PATENT DOCUMENTS

| 4,749,462 A | | 6/1988 | Bachot et al. |
| 5,532,198 A | * | 7/1996 | Chopin et al. ............ 502/304 |
| 5,607,892 A | * | 3/1997 | Chopin et al. ............ 502/304 |
| 5,626,826 A | * | 5/1997 | Chopin et al. ............ 423/213.2 |
| 6,171,572 B1 | * | 1/2001 | Aozasa ................. 423/594.12 |
| 6,214,306 B1 | * | 4/2001 | Aubert et al. ............ 423/213.2 |
| 6,248,688 B1 | | 6/2001 | Wu et al. |
| 6,852,666 B1 | * | 2/2005 | Bouly et al. ............. 502/304 |
| 2006/0210462 A1 | * | 9/2006 | Larcher et al. ........... 423/213.2 |

FOREIGN PATENT DOCUMENTS

| EP | 0 778 071 A1 | 6/1997 |
| FR | 2 570 087 | 3/1986 |
| WO | WO 97/02213 A1 | 1/1997 |
| WO | WO 98/45212 A1 | 10/1998 |
| WO | WO 03/020643 A1 | 3/2003 |

OTHER PUBLICATIONS

S. Brunauer et al., "Adsorption of Gases in Multimolecular Layers", *J. Chem. Soc*, vol. 30, Feb. 1938, pp. 309-319.

* cited by examiner

*Primary Examiner*—Cam N Nguyen
(74) *Attorney, Agent, or Firm*—Buchanan Ingersoll & Rooney PC

(57) ABSTRACT

A composition is based on zirconium oxide and cerium oxide with a proportion of zirconium oxide amounting to at least 50% by mass, having a maximum reducibility temperature of no more than 500° C. and a specific surface of at least 40 m²/g after 6 hours calcination at 500° C. in the form of a tetragonal phase. The composition can be used as a catalyst.

24 Claims, No Drawings

REDUCED MAXIMUM REDUCIBILITY TEMPERATURE ZIRCONIUM OXIDE AND CERIUM OXIDE BASED COMPOSITION, METHOD FOR THE PRODUCTION AND USE THEREOF AS A CATALYST

This application is an application under 35 U.S.C. Section 371 of International Application Number PCT/FR2004/000647 filed on Mar. 17, 2004, which claims the benefit of FR 03/03289 filed Mar. 18, 2003.

The present invention relates to a composition based on zirconium oxide and cerium oxide with a low maximum reducibility temperature, to its method of preparation and to its use as a catalyst.

At the present time, catalysts called "multifunctional" catalysts are used for the treatment of exhaust gases from internal combustion engines (by automobile postcombustion catalysis). Multifunctional catalysts are understood to mean those capable of carrying out not only oxidation, in particular of carbon monoxide and the hydrocarbons present in exhaust gases, but also reduction, in particular of nitrogen oxides also present in these gases ("three-way" catalysts). Today, zirconium oxide and cerium oxide appear to be two particularly important and advantageous constituents for this type of catalyst. To be effective, these catalysts must have a high specific surface area even at high temperature.

Another quality required of these catalysts is reducibility. The term "reducibility" is understood to mean, here and for the rest of the description, the capacity of the catalyst to be reduced in a reducing atmosphere and to be reoxidized in an oxidizing atmosphere. This reducibility can be measured by the capacity to capture hydrogen. It is due to the cerium in the case of compositions of the type of those of the invention, cerium having the property of being reduced or of being oxidized. This reducibility and, as a consequence, the effectiveness of the catalyst, are a maximum at a temperature that is currently rather high in the case of the known catalysts. This temperature is generally around 600° C. Now, there is a need for catalysts having a lower reducibility temperature and therefore for catalysts having a higher performance, within lower temperature ranges.

The object of the invention is therefore the development of a catalyst having a low reducibility temperature.

For this purpose, the composition of the invention is based on zirconium oxide and cerium oxide with a zirconium oxide proportion of at least 50% by weight, and it is characterized in that it has a maximum reducibility temperature of at most 500° C. and a specific surface area of at least 40 m$^2$/g after calcination for 6 hours at 500° C. and in that it is in the form of a tetragonal phase.

Other features, details and advantages of the invention will become even more fully apparent on reading the following description, and from specific but nonlimiting examples intended to illustrate it.

As regards the rest of the description, the term "specific surface area" is understood to mean the BET specific surface area determined by nitrogen adsorption in accordance with the ASTM D 3663-78 standard established on the basis of the Brunauer—Emmett—Teller method described in the periodical *The Journal of the American Chemical Society*, 60, 309 (1938).

The term "lanthanides" is understood to mean elements of the group formed by the elements of the Period Table with an atomic number lying between 57 and 71 inclusive.

It should be pointed out that in the rest of the description, unless otherwise indicated, in the ranges of values given the limiting values are inclusive.

The compositions of the invention are of the mixed oxide type, based on zirconium oxide, and also contain cerium oxide. They may also include at least one other element chosen from lanthanides other than cerium. In this case, the compositions may therefore be in particular ternary or quaternary compositions. The aforementioned element may more particularly be chosen from lanthanum, neodymium or praseodymium. Mention may more particularly be made of compositions based on zirconium, cerium, praseodymium and lanthanum, those based on zirconium, cerium, neodymium and lanthanum and those based on zirconium, cerium, praseodymium and neodymium.

The compositions of the invention have a specific structure. They are in the form of a tetragonal phase. More precisely, the tetragonal phase is predominant. The term "predominant" is understood to mean that the intensity of the diffraction peak corresponding to the crystal plane (111) of the tetragonal phase of the mixed oxide of the composition is at least equal to 1 times, more particularly at least equal to 4 times, the intensity of the main line of any other phase present. Mention may especially be made, as other phase of this type, of pure zirconium oxide in its tetragonal or monoclinic varieties, or else pure cerium oxide.

This structure is determined by XRD (X-ray diffraction) analysis on a product that has undergone calcination at a temperature of at least 900° C. for 6 hours.

According to one particular embodiment, the compositions of the invention may be in the form of a pure solid solution of cerium oxide and, optionally, of the other element. By this it is meant that the cerium and, as the case may be, the other element are completely present in solid solution in the zirconium. The XRD diffraction spectra of these compositions reveal in particular, within the latter, the existence of a clearly identifiable single phase corresponding to that of a zirconium oxide crystallized in the tetragonal system, thus resulting from the incorporation of cerium and the other element into the crystal lattice of zirconium oxide, and therefore the formation of a true solid solution.

The contents of the various constituents in the compositions of the invention may vary. These contents are expressed here, and for the rest of the description, as mass of oxide ($ZrO_2$, $CeO_2$ and $TR_2O_3$, TR denoting the lanthanide other than cerium) relative to the overall composition. The zirconium content is at least 50%, more particularly at least 65% and even more particularly at least 70%. The cerium content is generally less than 50%, more particularly at most 40% and even more particularly at most 25%. The content of the optional other element is usually at most 15% and it may be more particularly at most 10%, and it may be between 3% and 10%. In the case of compositions in the form of solid solutions, the upper limiting contents of the rare earth(s) other than cerium are in fact imposed solely by the solubility limit of this or these elements in zirconium oxide.

The compositions of the invention are essentially characterized by the fact that they have a maximum reducibility temperature of at most 500° C. This maximum reducibility temperature may be at most 480° C. and even more particularly at most 400° C. Thus, this maximum temperature may be between 300° C. and 500° C. and especially between 350° C. and 450° C.

The reducibility of the compositions is determined by measuring their capacity to capture hydrogen as a function of temperature. This measurement is also used to determine a maximum reducibility temperature that corresponds to the temperature at which hydrogen capture is a maximum and in which, in other words, the reduction of cerium (IV) to cerium (III) is also at a maximum.

The compositions of the invention are also characterized by a specific surface area. Indeed, while still having a low maximum reducibility temperature, they also offer high specific surface areas even at high temperatures.

Thus, the compositions of the invention possess a high specific surface area after calcination at 500° C. for 6 hours in air, which is at least 40 m$^2$/g. This surface area may be at least 60 m$^2$/g, more particularly at least 70 m$^2$/g and even more particularly at least 80 m$^2$/g after calcination at the same temperature for the same time. The invention makes it possible to obtain compositions still having at this same temperature and for the same time a surface area of possibility up to at least 89 m$^2$/g.

At even higher temperature, the compositions of the invention have a specific surface area of at least 30 m$^2$/g after calcination at 900° C. for 6 hours, this surface area possibly being at least 45 m$^2$/g. The invention makes it possible to obtain compositions still having at this same temperature and for the same time a surface area possibly of up to at least 53 m$^2$/g.

Finally, specific surface areas of at least 25 m$^2$/g, or even at least 30 m$^2$/g, may be achieved after calcination at 1000° C. for 6 hours. The invention makes it possible to obtain compositions still having at this same temperature and for the same time a surface area possibly up to at least 40 m$^2$/g.

A preferential feature of the compositions of the invention is that they contain no sulfur. By this it is meant that the sulfur content is less than 200 ppm, preferably less than 100 ppm. This content is expressed as mass of sulfate (SO$_4$) relative to the overall composition.

Finally, it will be noted that the compositions of the invention have, as indicated above, a low maximum reducibility temperature while still being able to be free of any metal of the type liable to activate hydrogen at low temperatures, that is to say below 300° C., such as noble metals (platinum, palladium, ruthenium, rubidium, iridium, gold, silver, manganese and bismuth) or else metals of Group VIII, such as nickel and iron.

The method of preparing the compositions of the invention will now be described.

This method is characterized in that it comprises the following steps:
(a) a mixture comprising a zirconium compound, a cerium compound and, optionally, a compound of an aforementioned element is formed;
(b) said mixture is brought into contact with a basic compound, by means of which a precipitate is obtained;
(c) said precipitate is heated in aqueous medium; then
(d) either firstly an additive, chosen from anionic surfactants, nonionic surfactants, polyethylene glycols, carboxylic acids and their salts, and surfactants of the carboxymethylated fatty alcohol ethoxylate type in the medium resulting from the previous step, is added and then said precipitate is possibly separated;
(d') or said precipitate is firstly separated and then said additive is added to the precipitate;
(e) the precipitate obtained in the previous step (d) or (d') is subjected to a milling operation; and
(f) the precipitate thus obtained is calcined.

The first step of the method therefore consists in preparing a mixture in a liquid medium of a zirconium compound, a cerium compound and optionally at least one compound of the additional aforementioned element.

The mixing is generally carried out in a liquid medium, which is preferably water.

The compounds are preferably soluble compounds. These may especially be zirconium, cerium and lanthanide salts. These compounds may be chosen from nitrates, sulfates, acetates, chlorides and ceric ammonium nitrates.

As examples, mention may thus be made of zirconium sulfate, zirconyl nitrate or zirconyl chloride. Most generally, zirconyl nitrate is used. Mention may also be especially made of cerium (IV) salts such as, for example, nitrates or ceric ammonium nitrates, which are particularly suitable here. Ceric nitrate may be used. It is advantageous to use salts with a purity of at least 99.5% and more particularly at least 99.9%. An aqueous ceric nitrate solution may for example be obtained by the reaction of nitric acid on a hydrated ceric oxide prepared conventionally by reacting a solution of a cerous salt, for example cerous nitrate, with an ammonia solution in the presence of hydrogen peroxide. It is also possible in particular to use a ceric nitrate solution obtained by the method of electrolytic oxidation of a cerous nitrate solution, as described in the document FR-A-2 570 087, which constitutes here an advantageous raw material.

It should be noted here that the aqueous solutions of cerium salts and zirconyl salts may have a certain initial free acidity, which can be adjusted by the addition of a base or an acid. However, it is equally possible to employ an initial solution of cerium and zirconium salts having actually a certain free acidity as mentioned above and solutions that will have been neutralized beforehand to a greater or lesser extent. This neutralization may be carried out by the addition of a basic compound to the aforementioned mixture so as to limit this acidity. This basic compound may for example be an ammonia solution or a solution of alkali metal (sodium, potassium, etc.) hydroxides, but preferably an ammonia solution.

Finally, it should be noted that, when the starting mixture contains a cerium compound in which cerium is in the Ce(III) form, it is preferable to employ, during the method, an oxidizing agent, for example hydrogen peroxide. This oxidizing agent may be used by being added to the reaction mixture during step (a) or during step (b), especially at the end of the latter step.

It is also possible to use a sol as starting compound of zirconium or cerium. The term "sol" denotes any system consisting of fine solid particles of colloidal dimensions, that is to say dimensions of between about 1 nm and about 500 nm, based on a zirconium or cerium compound, this compound generally being a zirconium or cerium oxide and/or hydrated oxide, in suspension in an aqueous liquid phase, said particles furthermore optionally being able to contain residual amounts of bonded or adsorbed ions, such as for example nitrate, acetate, chloride or ammonium ions. It should be noted that, in such a sol, the zirconium or cerium may be either completely in the form of colloids, or simultaneously in the form of ions and in the form of colloids.

It does not matter whether the mixture is obtained from compounds initially in the solid state, which will subsequently be introduced into an aqueous stock for example, or directly from solutions of these compounds, said solutions then being mixed in any order.

In the second step of the method, said mixture is brought into contact with a basic compound. As base or basic compound, it is possible to use products of the hydroxide type. Mention may be made of alkali metal or alkaline-earth metal hydroxides. It is also possible to use secondary, tertiary or quaternary amines. However, amines and aqueous ammonia may be preferred in so far as they reduce the risks of contamination by alkali metal or alkaline-earth metal cations. Mention may also be made of urea. The basic compound is generally used in the form of an aqueous solution.

The way in which the mixture and the solution are brought into contact with each other, that is to say the order of introduction thereof, is not critical. However, this contacting may be carried out by introducing the mixture into the solution of the basic compound. This variant is preferable in order to obtain compositions in the form of solid solutions.

The contacting or the reaction between the mixture and the solution, especially the addition of the mixture into the solution of the basic compound, may be carried out in a single step, gradually or continuously, and it is preferably performed with stirring. It is preferably carried out at room temperature.

The next step of the method is the step of heating the precipitate in aqueous medium.

This heating may be carried out directly on the reaction mixture obtained after reaction with the basic compound or on a suspension obtained after separating the precipitate from the reaction mixture, optionally washing it and putting it back into water. The temperature at which the medium is heated is at least 100° C. and even more preferably at least 130° C. The heating operating may be carried out by introducing the liquid medium into a sealed chamber (a closed reactor of the autoclave type). Under the temperature conditions given above, and in aqueous medium, it may be specified, by way of illustration, that the pressure in the closed reactor may vary between a value greater than 1 bar ($10^5$ Pa) and 165 bar ($1.65 \times 10^7$ Pa), preferably between 5 bar ($5 \times 10^5$ Pa) and 165 bar ($1.65 \times 10^7$ Pa). The heating may also be carried out in an open reactor for temperatures close to 100° C.

The heating may be carried out either in air or in an inert gas atmosphere, preferably in nitrogen.

The duration of the heating may vary widely, for example between 1 and 48 hours, preferably between 2 and 24 hours. Likewise, the rate at which the temperature rises is not critical—it is thus possible to reach the fixed reaction temperature by heating the medium for example between 30 minutes and 4 hours, these values being given merely by way of indication.

The heated medium generally has a pH of at least 5. Preferably, this pH is basic, that is to say it is greater than 7 and more particularly at least 8.

It is possible to carry out several heating operations. Thus, the precipitate obtained after the heating step and optionally a washing operation may be resuspended in water and then another heating operation may be carried out on the medium thus obtained. This other heating operation is carried out under the same conditions as those described for the first one.

The next step of the method may be carried out according to two variants.

According to a first variant, an additive, which is chosen from anionic surfactants, nonionic surfactants, polyethylene glycols, carboxylic acids and their salts, and surfactants of the carboxymethylated fatty alcohol ethoxylate type, is added to the reaction mixture obtained after the preceding step. As regards this additive, reference may be made to the teaching of Application WO-98/45212 and the surfactants described in that document may be used.

Mention may be made, as surfactants of the anionic type, of ethoxycarboxylates, ethoxylated or propoxylated fatty acids, especially of the brand name ALKAMULS®, sarcosinates of formula R—C(O)N(CH$_3$)CH$_2$COO$^-$, betaines of formula RR'NH—CH$_3$—COO$^-$, R and R' being alkyl or arylalkyl groups, phosphate esters, especially those of the brand name RHODAFAC®, sulfates such as alcohol sulfates, alcohol ether sulfates and sulfated alkanolamide ethoxylates, sulfonates such as sulfosuccinates, alkylbenzenesulfonates or alkylnaphthalenesulfonates. However, it should be noted that surfactants containing sulfur should not be used for preparing the sulfur-free compositions that were described above.

As nonionic surfactants, mention may be made of acetylenic surfactants, ethoxylated or propoxylated fatty alcohols, for example those of the brand names RHODASURF® or ANTAROX®, alkanolamides, amine oxides, ethoxylated alkanolamides, long-chain ethoxylated or propoxylated amines, for example of the brand name RHODAMEEN®, ethylene oxide/propylene oxide copolymers, sorbitan derivatives, ethylene glycol, propylene glycol, glycerol, polyglyceryl esters and their ethoxylated derivatives, alkylamines, alkylimidazolines, ethoxylated oils and ethoxylated or propoxylated alkylphenols, especially of the brand name IGEPAL®. Mention may also be made in particular of the products cited in WO-98/45212 under the brand names IGEPAL®, DOWANOL®, RHODAMOX® and ALKAMIDE®.

As regards carboxylic acids, it is possible to use in particular aliphatic monocarboxylic or dicarboxylic acids and, among these, saturated acids may more particularly be used. Use may also be made of fatty acids and more particularly of saturated fatty acids. Thus, mention may especially be made of formic, acetic, propionic, butyric, isobutyric, valeric, caproic, caprylic, capric, lauric, myristic, palmitic, stearic, hydroxystearic, 2-ethylhexanoic and behenic acids. As dicarboxylic acids, mention may be made of oxalic, malonic, succinic, glutaric, adipic, pimelic, suberic, azelaic and sebacic acids.

The salts of carboxylic acids may also be used, especially ammoniacal salts.

As an example, mention may more particularly be made of lauric acid and ammonium laurate.

Finally, it is possible to use a surfactant chosen from those of the carboxymethylated fatty alcohol ethoxylate type.

The term "product of the carboxymethylated fatty alcohol ethoxylate type" is understood to mean products composed of ethoxylated or propoxylated fatty alcohols having a CH$_2$—COOH group at the chain end.

These products may correspond to the formula:

$$R_1\text{—O—}(CR_2R_3\text{—}CR_4R_5\text{—O})_n\text{—}CH_2\text{—COOH},$$

in which $R_1$ denotes a saturated or unsaturated carbon chain, the length of which is generally at most 22 carbon atoms, preferably at least 12 carbon atoms; $R_2$, $R_3$, $R_4$ and $R_5$ may be identical and represent hydrogen or else $R_2$ may represent a CH$_3$ group and $R_3$, $R_4$ and $R_5$ represent hydrogen; n is a nonzero integer that can range up to 50 and more particularly is between 5 and 15, these values being inclusive. It should be noted that a surfactant may consist of a mixture of products of the above formula in which $R_1$ may be saturated and unsaturated respectively or else products comprising both —CH$_2$—CH$_2$—O— and —C(CH$_3$)—CH$_2$—O— groups.

After the surfactant has been added, the precipitate is optionally separated from the liquid medium by any known means.

Another variant consists in firstly separating the precipitate resulting from step (c) and then in adding the surfactant additive to this precipitate.

The amount of surfactant used, expressed as a percentage by weight of additive relative to the weight of the composition calculated as oxide, is generally between 5% and 100%, more particularly between 15% and 60%.

The next step of the method consists in subjecting the precipitate obtained at the preceding step to a milling operation.

This milling may be carried out in various ways.

A first way consists in carrying out a high-energy milling operation of the wet milling type. Such milling is carried out on the wet precipitate obtained either after step (d') or after step (d) in the case in which this precipitate has been well separated from its original liquid medium. The wet milling may be carried out for example in a ball mill.

A second way consists in carrying out a moderate-energy milling operation by subjecting a suspension of the precipitate to a shearing action, for example using a colloid mill or a turbine agitator. This suspension may be an aqueous suspension obtained by resuspending in water the precipitate obtained after steps (d) or (d'). This may also the suspension obtained directly after step (d) after the surfactant has been added, without the precipitate having been separated from the liquid medium.

After the milling, the product obtained may optionally be dried, for example by passing it into an oven.

The last step of the process is a calcination step.

This calcination allows the crystallinity of the product obtained to be increased, and it may also be adjusted and/or chosen depending on the subsequent use temperature reserved for the composition according to the invention, taking into account the fact that the specific surface area of the product is lower the higher the calcination temperature employed.

According to a first method of implementation, the calcination takes place in an oxidizing atmosphere, for example in air. In this case, the calcination is generally carried out at a temperature of between 300 and 1000° C. for a time of generally at least 30 minutes.

According to a second method of implementation, and this method of implementation is most particularly preferred when the milling carried out in the preceding step (e) is moderate-energy milling, the calcination is carried out firstly in a stream of an inert gas and then secondly in an oxidizing atmosphere.

In this case, the inert gas may more particularly be nitrogen. This first calcination is then carried out at a temperature of generally between 800° C. and 1000° C. for a time of at least one hour. The calcination in an oxidizing atmosphere is carried out at a temperature that may be between 300° C. and 700° C. for at least 30 minutes.

The compositions of the invention, as described above or as obtained by the method mentioned above, are in the form of powders, but they may optionally be formed into granules, beads, cylinders or honeycombs of varying dimensions. These compositions may be applied to any support normally used in the catalysis field, that is to say, in particular, thermally inert supports. This support may be chosen from alumina, titanium oxide, cerium oxide, zirconium oxide, silica, spinels, zeolites, silicates, crystalline silicon aluminum phosphates and crystalline aluminum phosphates.

The compositions may also be used in catalytic systems. These catalytic systems may include a wash coat having catalytic properties and based on these compositions, on a substrate for example of the metal or ceramic monolith type. The wash coat may itself include a support of the type of those mentioned above. This wash coat is obtained by mixing the composition with the support so as to form a suspension that may then be deposited on the substrate.

These catalytic systems, and more particularly the compositions of the invention, may have very numerous applications. They are thus particularly well suited to, and therefore usable in, the catalysis of various reactions such as, for example, dehydration, hydrosulfurization, hydrodenitrification, desulfuriza-tion, hydrodesulfurization, dehydrohalogenation, reforming, steam reforming, cracking, hydrocracking, hydrogenation, dehydrogenation, isomerization, dismutation, oxychlorination and dehydrocyclization of hydrocarbons or other organic compounds, oxidation and/or reduction reactions, the Claus reaction, the treatment of internal combustion exhaust gases, demetalization, methanation, shift conversion, catalytic oxidation of soot emitted by internal combustion engines, such as diesel or petrol engines operating in lean mode. Finally, the catalytic systems and the compositions of the invention may be used as NOx traps.

In the case of these uses in catalysis, the compositions of the invention may be employed in combination with precious metals. The nature of these metals and the techniques of incorporating them into these compositions are well known to those skilled in the art. For example, the metals may be platinum, rhodium, palladium or iridium, and they may especially be incorporated into the compositions by impregnation.

Among the uses mentioned, the treatment of internal combustion engine exhaust gases (by automobile postcombustion catalysis) constitutes one particularly advantageous application.

Consequently, the invention also relates to the use of a composition or of a catalytic system such as those described above for the manufacture of a catalyst for automobile postcombustion.

Specific but nonlimiting examples will now be given.

In these examples, the degree of reducibility given represents the percentage of cerium reduced, it being understood that 0.5 mol of $H_2$ consumed and measured by the method that will be explained below corresponds to 1 mol of Ce(IV) reduced.

The reducibility measurement is carried out by temperature programmed reduction in the following manner. An Altamira MI-100 apparatus is used with a silica reactor and a 200 mg specimen that has been calcined beforehand for 10 hours at 1000° C. in air. The gas comprised 10% hydrogen by volume in argon with a flow rate of 30 ml/min. The temperature rise takes place from room temperature up to 900° C. at a rate of 10° C./min. The signal is detected with a 70 mA thermal conductivity detector. Hydrogen capture is calculated from the area missing from the hydrogen signal from the baseline at room temperature to the baseline at 900° C. The maximum reducibility temperature as defined above is measured using a thermocouple placed in the core of the specimen.

EXAMPLE 1

This example relates to the preparation of a composition whose contents, expressed as percentages by weight, are 72% as regards zirconium oxide, 21% as regards cerium oxide, 2% as regards lanthanum oxide and 5% as regards neodymium oxide.

Introduced into a stirred beaker were 900 ml of zirconium nitrate (80 g/l), 42.3 ml of cerium nitrate (the cerium being in oxidation state III) (496 g/l), 4.4 ml of lanthanum nitrate (454 g/l) and 9.5 ml of neodymium nitrate (524 g/l). Distilled water was then added so as to obtain 1 liter of a solution of these nitrates.

Introduced into a stirred reactor were 250 ml of an aqueous ammonia solution (12 mol/l), 74 ml of hydrogen peroxide (110 volumes) and distilled water was then added so as to obtain a total volume of 1 liter.

The solution of nitrates was introduced over 1 hour into the reactor with constant stirring so as to obtain a suspension.

The suspension obtained was placed in a stainless steel autoclave fitted with a stirrer. The temperature of the medium was raised to 150° C. over 2 hours with stirring.

The suspension this obtained was then filtered on a Buchner funnel. A pale yellow precipitate containing 20% oxide by weight was recovered.

76 g of this precipitate were taken and placed in a ball mill (Molinex PE 075 of the Netzch brand).

In parallel, an ammonium laurate gel was prepared under the following conditions: 250 g of lauric acid were introduced into 135 ml of aqueous ammonia (12 mol/l) and 500 ml of distilled water, and then the mixture was homogenized using a spatula.

24 g of this gel were added to the precipitate in the ball mill. The mixture was completed by adding 100 ml of distilled water and 250 ml of zirconia beads (with a diameter of 0.4 to 0.7 mm). The whole mixture was milled at 1500 rpm for 60 minutes.

The precipitate was then washed on a screen in order to recover the milling balls. The suspension obtained was then dried in an oven at 60° C. for 24 hours. The dried product was then heated to 900° C., in air, for 4 hours in stages.

The characteristics of the product are given in Table 1 below.

TABLE 1

| Surface area: | |
| --- | --- |
| 6 h/500° C. | 83 m$^2$/g |
| 6 h/900° C. | 50 m$^2$/g |
| 6 h/1000° C. | 38 m$^2$/g |
| Maximum reducibility temperature | 475° C. |
| Degree of reducibility | 80% |
| Structure | 100% tetragonal phase |

EXAMPLE 2

A composition having the same contents of zirconium, cerium, lanthanum and neodymium oxides as in Example 1 was prepared.

The procedure was as in Example 1 as far as the treatment of the suspension in the autoclave. After cooling down to room temperature following this treatment, 500 ml of the suspension were removed. 8 g of lauric acid were added to this suspension. After homogenization, the mixture obtained was subjected to a shearing action using an Ultraturax® apparatus at a speed of 1000 rpm for 15 minutes.

The suspension obtained was then filtered on a Büchner funnel. The solid obtained was dried in an oven at 50° C. for 12 hours. The dried product was placed in a quartz tube reactor. Fluidized-bed calcination was then carried out under nitrogen with a flow rate of 100 cm$^3$/min. The calcination temperature was 900° C. and the calcination time was 4 hours. After this calcination, the product was returned to room temperature under nitrogen. Next, a second calcination was carried out, at 500° C. for two hours in stages in an atmosphere comprising 10% oxygen in nitrogen.

The characteristics of the product are given in Table 2 below.

TABLE 2

| Surface area: | |
| --- | --- |
| 6 h/500° C. | 84 m$^2$/g |
| 6 h/900° C. | 46 m$^2$/g |
| 6 h/1000° C. | 37 m$^2$/g |
| Maximum reducibility temperature | 375° C. |
| Degree of reducibility | 80% |
| Structure | 100% tetragonal phase |

The invention claimed is:

1. A composition comprising zirconium oxide and cerium oxide, the composition comprising a zirconium oxide proportion of at least 50% by weight, a maximum reducibility temperature of at most 500° C., a specific surface area of at least 40 m$^2$/g after calcination for 6 hours at 500° C., and comprising a predominant tetragonal phase.

2. The composition as claimed in claim 1, further comprising at least one lanthanide other than cerium.

3. The composition as claimed in claim 2, wherein the lanthanide is lanthanum, neodymium or praseodymium.

4. The composition as claimed in claim 2, wherein the composition is in the form of a solid solution of cerium, and the at least one lanthanide other than cerium, in zirconium oxide.

5. The composition as claimed in claim 1, comprising a zirconium oxide content of at least 65% by weight.

6. The composition as claimed in claim 1, comprising a maximum reducibility temperature of at most 480° C.

7. The composition as claimed in claim 6, having a maximum reducibility temperature of at most 400° C.

8. The composition as claimed in claim 1, comprising a specific surface area of at least 70 m$^2$/g.

9. The composition as claimed in claim 8, having a specific surface area of at least 80 m$^2$/g after calcination at 500° C. for 6 hours.

10. The composition as claimed in claim 1, comprising a specific surface area of at least 30 m$^2$/g after calcination at 900° C. for 6 hours.

11. The composition as claimed in claim 10, comprising a specific surface area of at least 45 m$^2$/g after calcination at 900° C. for 6 hours.

12. The composition as claimed in claim 1, comprising a specific surface area of at least 25 m$^2$/g after calcination at 1000° C. for 6 hours.

13. The composition as claimed in claim 1, wherein the composition is in the form of a solid solution of cerium, in zirconium oxide.

14. A method of preparing a composition as claimed in claim 1, comprising the following steps:
    (a) forming a mixture comprising a zirconium compound, a cerium compound and, optionally, a lanthanide other than cerium;
    (b) mixing said mixture with a basic compound, to obtain a precipitate;
    (c) heating said precipitate in an aqueous medium;
    (d) either firstly adding an additive, selected from the group consisting of anionic surfactants, nonionic surfactants, polyethylene glycols, carboxylic acids, salts of carboxylic acids, and surfactants of the carboxymethylated fatty alcohol ethoxylate type in the medium resulting from step (c), and, then, optionally separating said precipitate; or (d') firstly separating the precipitate obtained in step (c) and, then, adding said additive to the precipitate;
    (e) subjecting to a milling operation the precipitate obtained in step (d) or (d'); and
    (f) calcining the precipitate obtained in step (e).

15. The method as claimed in claim 14, wherein in step (f) the precipitate is calcined either in an oxidizing atmosphere or firstly in an inert gas and then secondly in an oxidizing atmosphere.

16. The method as claimed in claim 14, wherein, the zirconium compound, the cerium compound and the lanthanide other than cerium, is a nitrate, acetate, chloride or ceric ammonium nitrate compound.

17. The method as claimed in claim 14, wherein the zirconium or cerium compound is a sol.

18. The method as claimed in claim 14, wherein, in the mixture of step (a), the cerium compound presents cerium in the Ce(III) form and during step (a) or during step (b), an oxidizing agent is added.

19. The method as claimed in claim 14, wherein in step (b) the mixture is added into a solution of basic compound.

20. The method as claimed in claim 14, wherein in step (c) the precipitate is being heated to a temperature of at least 100° C.

21. The method as claimed in claim 14, wherein in step (e), the milling is a wet milling operation.

22. The method as claimed in claim 14, wherein in step (e), the milling is carried out by subjecting a suspension of the precipitate to a shearing action.

23. A catalytic system, comprising the composition as claimed in claim 1.

24. A method of automobile post-combustion catalysis of exhaust gases of an internal combustion engine, said method comprising the step of treating said exhaust gases with a catalytic system as claimed in claim 23.

* * * * *